United States Patent
Yoon et al.

(10) Patent No.: US 8,571,302 B2
(45) Date of Patent: Oct. 29, 2013

(54) METHOD AND APPARATUS TO BUILD 3-DIMENSIONAL GRID MAP AND METHOD AND APPARATUS TO CONTROL AUTOMATIC TRAVELING APPARATUS USING THE SAME

(75) Inventors: Sukjune Yoon, Seoul (KR); Kyung Shik Roh, Seongnam-si (KR); Woong Kwon, Seongnam-si (KR); Seung Yong Hyung, Yongin-si (KR); Hyun Kyu Kim, Seoul (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 174 days.

(21) Appl. No.: 12/411,446

(22) Filed: Mar. 26, 2009

(65) Prior Publication Data
US 2010/0040279 A1 Feb. 18, 2010

(30) Foreign Application Priority Data
Aug. 12, 2008 (KR) ........................ 10-2008-0078692

(51) Int. Cl.
G06K 9/00 (2006.01)
(52) U.S. Cl.
USPC ........................................ 382/153; 382/154
(58) Field of Classification Search
USPC ........... 382/153, 154; 700/245, 253, 261, 217
See application file for complete search history.

(56) References Cited

U.S. PATENT DOCUMENTS

| 6,412,961 B1 * | 7/2002 | Hicks | 359/846 |
| 6,744,569 B2 * | 6/2004 | Geng | 359/725 |
| 7,912,583 B2 * | 3/2011 | Gutmann et al. | 700/245 |

FOREIGN PATENT DOCUMENTS

| JP | 2005-037378 | 10/2005 |
| JP | 2007-041656 | 2/2007 |

OTHER PUBLICATIONS

Correa, F. R.; Deccó, C. C. G.; Okamoto Jr., J.: "Obtaining range information with an omnidirectional vision system"; 17th International Congress of Mechanical Engineering; Proceedings in CD-ROM; São Paulo, SP; 2003.*
Joshua Gluckman, Shree K. Nayar and Keith J. Thoresz, "Real-Time Omnidirectional and Panoramic Stereo", 1998.*
J. S. Chahl and M. V. Srinivasan, "Range estimation with a panoramic visual sensor", J. Opt. Soc. Am. A/ vol. 14, No. 9/Sep. 1997.*
Duke Gledhilla, Gui Yun Tiana, Dave Taylora, David Clarkeb, "Panoramic imaging—a review", Computers & Graphics 27 (2003) 435-445.*
Tomas Svoboda, Tomas Pajdla and Vaclav Hlavac,Epipolar Geometry for Panoramic Cameras, 1998.*
NPL, Wikipedia, Spherical Coordinate System.pdf.*
NPL—Faugeras et al., Real-time correalation-based stereo: algorithm, implementation and application., Technical Report 2013, INRIA Sophia Antipolis, 1993.*
Japanese Office Action Issued on Aug. 7, 2012 in JP Patent Application No. 2009-088934.
HyperOmni Vision, Aug. 5, 1997; PSS080475. pp. 1-95.
Miguel Angek Garcia and Agusti Solanas, 3D Simultaneous Localization and Modeling from Stereo Vision, proceedings of the 2004 IEEE International Conference on Robotics & Automation New Orleans, LA*Apr. 2004. pp. 847-853 vol. 1.

* cited by examiner

Primary Examiner — David Zarka
Assistant Examiner — Ha Le
(74) Attorney, Agent, or Firm — Stanzione & Kim, LLP

(57) ABSTRACT

A method and apparatus to build a 3-dimensional grid map and a method and apparatus to control an automatic traveling apparatus using the same. In building a 3-dimensional map to discern a current location and a peripheral environment of an unmanned vehicle or a mobile robot, 2-dimensional localization and 3-dimensional image restoration are appropriately used to accurately build the 3-dimensional grid map more rapidly.

15 Claims, 7 Drawing Sheets

METHOD AND APPARATUS TO BUILD 3-DIMENSIONAL GRID MAP AND METHOD AND APPARATUS TO CONTROL AUTOMATIC TRAVELING APPARATUS USING THE SAME

CROSS-REFERENCE TO RELATED APPLICATIONS

This application claims priority under 35 U.S.C. §119 from Korean Patent Application No. 2008-0078692, filed on Aug. 12, 2008 in the Korean Intellectual Property Office, the disclosure of which is incorporated herein by reference.

BACKGROUND OF THE INVENTION

1. Field of the Invention

The present general inventive concept relates to a method and apparatus to build a 3-dimensional grid map, and more particularly, to a method and apparatus to build a 3-dimensional grid map by discerning a peripheral environment using a stereo omni-directional camera, and method and apparatus to control an automatic traveling apparatus.

2. Description of the Related Art

An omni-directional camera is a camera system which takes a picture in all directions at once using a rotating reflector, a condenser lens, and an image pickup device and is applied to security facilities, surveillance cameras, robot visions, etc. The rotating reflector may have a hyperbolic, spherical, cone, or combined shape. A charge coupled device (CCD) or a complementary metal oxide semiconductor (CMOS) is used as the image pickup device. An image (i.e., omni-directional image) projected on a pickup surface of the image pickup device is formed by reflection from the rotating reflector and shows a distorted image which is not proper for observation. Therefore, for accurate observation of an image, output coordinates of the image pickup device are converted through, for example, an external microprocessor to generate a new panoramic image.

An omni-directional image obtained through the omni-directional camera provides 2-dimensional information for the periphery of the camera (i.e., objects surrounding the camera, objects disposed around the camera, or images captured by the camera). If a plurality of omni-directional images photographed from different directions through a plurality of omni-directional cameras is used, 3-dimensional information for the periphery of the omni-directional cameras (i.e., objects surrounding the camera, objects disposed around the camera, or images captured by the camera) can be obtained. An image apparatus having a plurality of omni-directional cameras is called a stereo omni-directional camera. An omni-directional image photographed from the stereo omni-directional camera is used for location recognition of an unmanned vehicle or a mobile robot and for map generation, by equipping the unmanned vehicle or mobile robot with the stereo omni-directional camera.

SUMMARY OF THE INVENTION

The present general inventive concept provides a method capable of accurately recognizing a 3-dimensional location and building a map within a fast time, in 3-dimensional localization and mapping to discern a current location and a peripheral environment of an automatic controlling or traveling apparatus, for example, an unmanned vehicle or a mobile robot.

Additional aspects and/or advantages of the present general inventive concept will be set forth in part in the description which follows and, in part, will be obvious from the description, or may be learned by practice of the general inventive concept.

In an embodiment and utilities of the present general inventive concept, there is provided a method to build a 3-dimensional grid map, the method including acquiring a peripheral omni-directional image using a stereo omni-directional camera, confirming a current 2-dimensional location using the omni-directional image, performing 3-dimensional restoration of the omni-directional image, and building the 3-dimensional grid map of the periphery of the stereo omni-directional camera by combining a result of the 2-dimensional localization and a result of the 3-dimensional restoration.

The confirming of a 2-dimensional location may be performed through 2-dimensional localization and mapping using the omni-directional image.

The confirming of a 2-dimensional location may be performed using feature points on an epipolar line of the omni-directional image.

The feature points may be obtained by extracting a color edge.

A degree of occupation of a 3-dimensional grid may be obtained using a result of the 3-dimensional restoration.

If a count occupied by a voxel of the 3-dimensional grid exceeds a prescribed number, a corresponding voxel may be determined to be occupied.

In an embodiment and utilities of the present general inventive concept, there is also provided a method to control an automatic traveling apparatus, the method including acquiring a peripheral omni-directional image using a stereo omni-directional camera, confirming a current 2-dimensional location using the omni-directional image, performing 3-dimensional restoration of the omni-directional image, building a 3-dimensional grid map of the periphery of the stereo omni-directional camera by combining a result of the 2-dimensional localization and a result of the 3-dimensional restoration, determining a traveling path to a target point from a current location based on the 3-dimensional restoration, and controlling the automatic traveling apparatus to travel to the target point along the traveling path.

The confirming of a 2-dimensional location may be performed through 2-dimensional localization and mapping using the omni-directional image.

The confirming of a 2-dimensional location may be performed using feature points on an epipolar line of the omni-directional image.

The feature points may be obtained by extracting a color edge.

A degree of occupation of a 3-dimensional grid may be obtained using a result of the 3-dimensional restoration.

If a count occupied by a voxel of the 3-dimensional grid exceeds a prescribed number, a corresponding voxel may be determined to be occupied.

In an embodiment and utilities of the present general inventive concept, there is also provided a computer readable medium to contain computer-readable codes as a program to perform a method to build a 3-dimensional grid map, the method including acquiring a peripheral omni-directional image using a stereo omni-directional camera, confirming a current 2-dimensional location using the omni-directional image, performing 3-dimensional restoration of the omni-directional image, and building the 3-dimensional grid map of the periphery of the stereo omni-directional camera by combining a result of the 2-dimensional localization and a result of the 3-dimensional restoration.

In an embodiment and utilities of the present general inventive concept, there is also provided an apparatus to build a 3-dimensional grid map, including a camera to acquire a peripheral omni-directional image using a stereo omni-directional camera, and a controller to confirm a current 2-dimensional location using the omni-directional image, to perform 3-dimensional restoration of the omni-directional image, and to build the 3-dimensional grid map of the periphery of the stereo omni-directional camera by combining a result of the 2-dimensional localization and a result of the 3-dimensional restoration.

In an embodiment and utilities of the present general inventive concept, there is also provided a traveling apparatus to move along a path, including a controller to receive one or more peripheral omni-directional images from a stereo omni-directional camera, to confirm a current 2-dimensional location using the omni-directional images, to perform 3-dimensional restoration of the omni-directional images, and to build the 3-dimensional grid map of the periphery of the stereo omni-directional camera by combining a result of the 2-dimensional localization and a result of the 3-dimensional restoration, and a moving device to move a body of the traveling apparatus according to a traveling path with respect to the 3-dimensional grid map.

In an embodiment and utilities of the present general inventive concept, there is also provided a method to build a 3-dimensional grid map, including generating a current 2-dimensional location using one or more omni-directional images, and a 3-dimensional restoration of the omni-directional image, and building the 3-dimensional grid map by combining a result of the 2-dimensional localization and a result of the 3-dimensional restoration

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
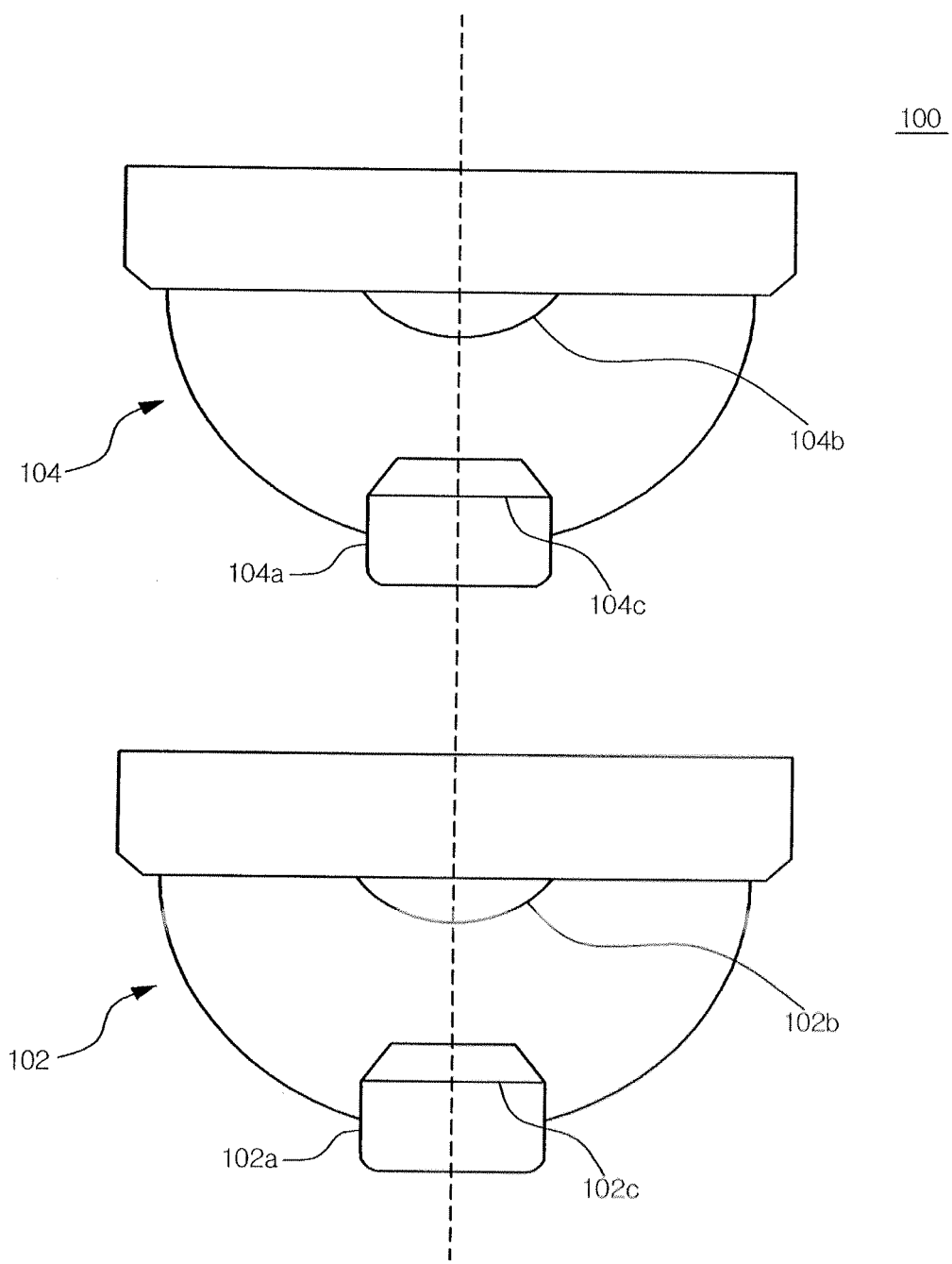
FIG. 1 illustrates a stereo omni-directional camera according to an exemplary embodiment of the present general inventive concept.

Reference will now be made in detail to the embodiments of the present general inventive concept, examples of which are illustrated in the accompanying drawings, wherein like reference numerals refer to the like elements throughout. The embodiments are described below to explain the present general inventive concept by referring to the figures.

An exemplary embodiment of a method and apparatus to build a 3-dimensional grid map and a method and apparatus to control an automatic traveling apparatus using the 3-dimensional grid map is described with reference to FIGS. 1 to 6. The method and apparatus to build a 3-dimensional grid map according to an exemplary embodiment of the present general inventive concept may be applied when determining a traveling path by discerning a current location and a peripheral environment in unmanned vehicles, mobile robots, etc. The method and apparatus may also be applied to a security device, a surveillance device, etc.

FIG. 1 illustrates a stereo omni-directional camera 100 according to an exemplary embodiment of the present general inventive concept. The stereo omni-directional camera 100 includes a first omni-directional camera 102 and a second omni-directional camera 104 which are arranged in a row and face in the same direction. Although not illustrated, the first and second omni-directional cameras 102 and 104 may be fixed using an additional fixing unit with respect to a reference surface, i.e., a fixing surface.

The first and second omni-directional cameras 102 and 104 may be spaced apart from each other by a predetermined distance. The first and second omni-directional cameras 102 and 104 may be disposed on a first surface having a first distance with the reference surface, and a second surface having a second distance with the reference surface. The first distance and the second distance may be different such that images captured by the first and second omni-directional cameras 102 and 104 cannot overlap. It is possible that the first distance and the second distance can be adjusted such that images captured the first and second omni-directional cameras 102 and 104 can overlap each other by a predetermined area. The predetermined area may be a minimum area between the images to avoid any interference between them and to generate required or desired information to build a three dimensional map. It is also possible that the first and second omni-directional cameras 102 and 104 can be disposed on different axes and on different surfaces with respect to the reference surface.

It is also possible that the first and second omni-directional cameras 102 and 104 can be disposed on a same axis and on a different surface at a different angle with respect to the reference surface such that images captured the first and second omni-directional cameras 102 and 104 can be generated to avoid any interference between them and to generate required or desired information to build a three dimensional map.

In the first omni-directional camera 102, a camera module 102a faces a rotating reflector 102b. The rotating reflector 102b reflects incident light at 360° of the periphery of the first omni-directional camera 102 toward the camera module 102a. The camera module 102a includes a charge coupled device (CCD) 102c to form a pickup surface and converts incident light reflected at the rotating reflector 102b into electric energy to generate an image signal. Therefore, first omni-directional camera 102 generates information on objects surrounding the camera 102, objects disposed around the camera, or captured images with respect to the first omni-directional camera 102.

The second omni-directional camera 104 is comprised of a camera module 104a and a rotating reflector 104b. The camera module 104a includes a charge coupled device (CCD) 104c to form a pickup surface and converts incident light reflected at the rotating reflector 104b into electric energy to generate an image signal.

Each of the first and second omni-directional cameras 102 and 104 captures one or more images (i.e., an omni-directional image) at a viewing angle of 360° with respect to the corresponding first and second omni-directional cameras 102 and 104 to generate an image signal. However, since one omni-directional image provides only 2-dimensional information of an object, 3-dimensional information of the object is obtained using two omni-directional images captured at different locations.

Figure 2:
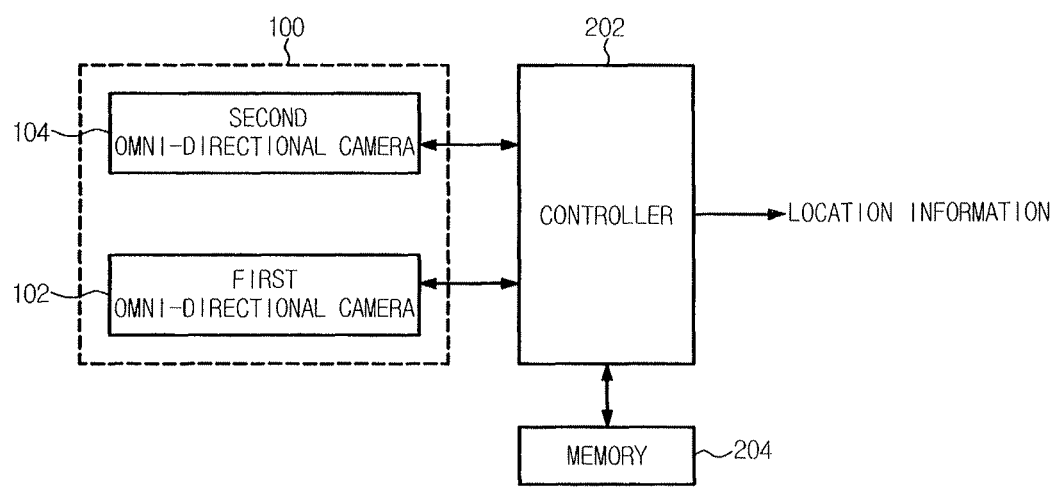
FIG. 2 is a block diagram illustrating a control system of the stereo omni-directional camera shown in FIG. 1.

FIG. 2 is a block diagram illustrating a control system of the stereo omni-directional camera of FIG. 1. The first and second omni-directional cameras 102 and 104 of a stereo omni-directional camera 100 are electrically connected to inputs of a controller 202 to be able to communicate with the controller 202. The controller 202 converts electric signals generated from the first and second omni-directional cameras 102 and 104 into image signals and builds a 3-dimensional map of the periphery of the stereo omni-directional camera 100 from images achieved through the image signals. The built 3-dimensional map is stored in a memory 204 and is updated whenever the location of the stereo omni-directional camera 100 is changed. If an unmanned vehicle or a mobile robot is equipped with the stereo omni-directional camera 100, location control or motion control is performed by recognizing the current location and peripheral geography of the unmanned vehicle or mobile robot from the 3-dimensional map.

Figure 3:
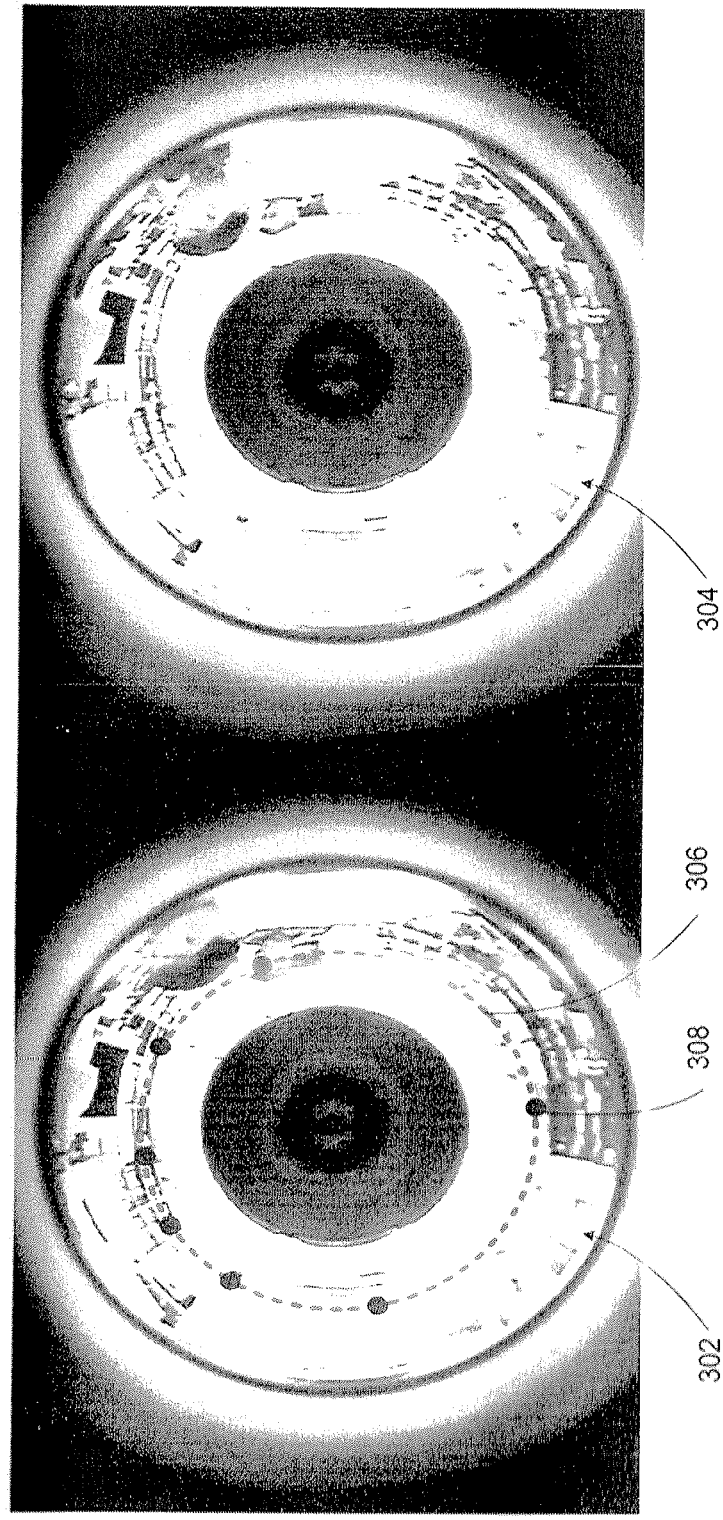
FIG. 3 illustrates images captured by the stereo omni-directional camera of FIG. 1.

FIG. 3 illustrates images captured by the stereo omni-directional camera of FIG. 1. As illustrated in FIG. 3, when the stereo omni-directional camera 100 photographs the periphery of the stereo omni-directional camera 100 ((i.e., objects surrounding the camera, objects disposed around the camera, or images captured by the camera), a first omni-directional image 302 is captured through the first omni-directional camera 102 and a second omni-directional image 304 is captured through the second omni-directional camera 104. In an exemplary embodiment of the present general inventive concept, an epipolar line 306 of the first omni-directional image 302 obtained through the first omni-directional camera 102 is obtained and one or more feature points 308 on the epipolar line 306 are extracted to obtain 2-dimensional coordinates of the feature points 308. The 2-dimensional coordinates of the feature points 308 are used to build a 3-dimensional grid map. According to an exemplary embodiment of the present general inventive concept, a color edge extracting method is used to extract the feature points 308. The color edge extracting method is well-known, detailed descriptions thereof will be omitted.

The epipolar line represents a line formed on a same level within an image (i.e., the first omni-directional image 302 or second omni-directional image 304) in an epipolar geometry, i.e., the geometry of a stereo vision. The feature points represent one or more objects or images disposed on/along the epipolar line. It is also possible that the feature points represent points disposed at one or more designated positions on the epipolar line.

Figure 4:
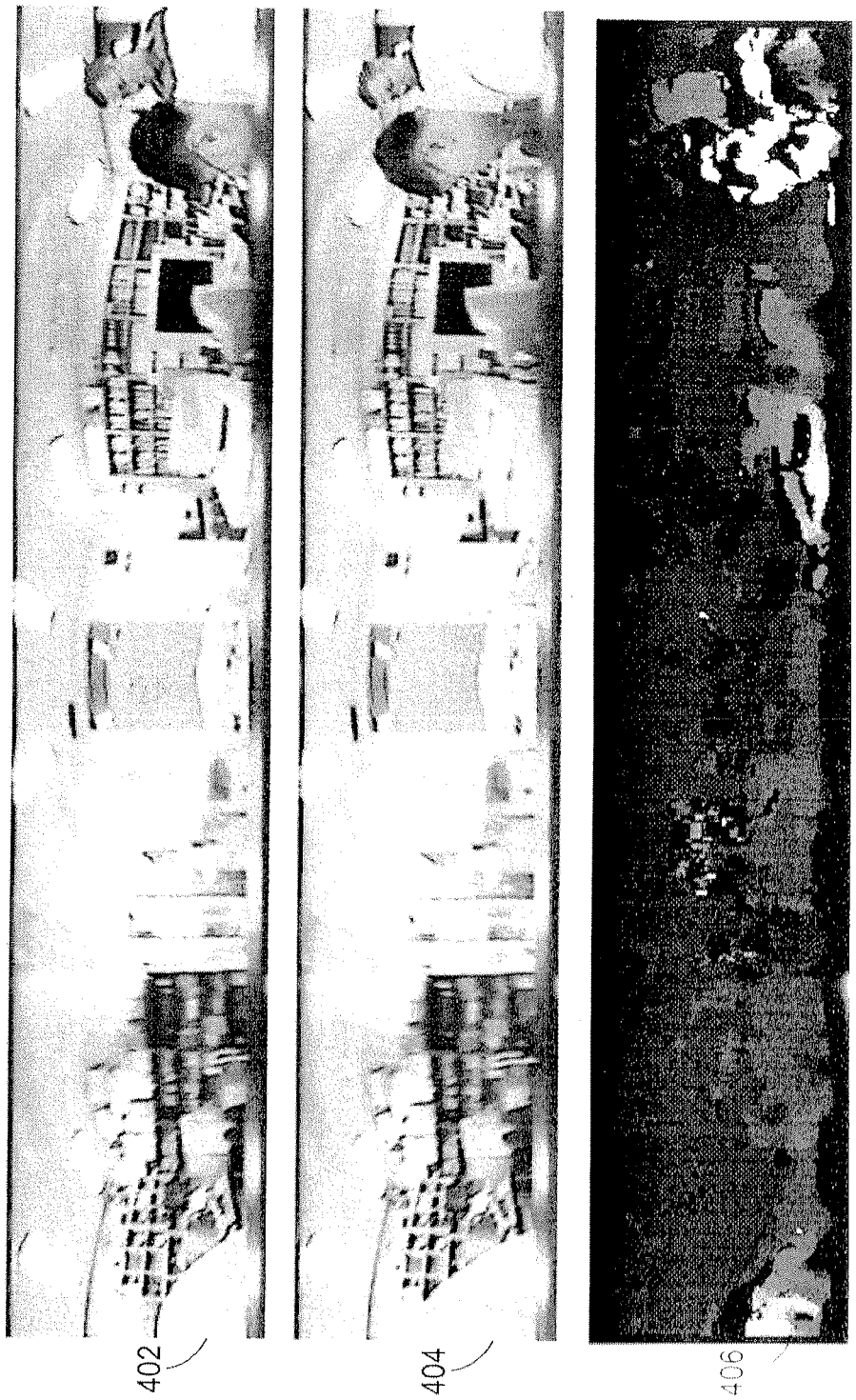
FIG. 4 illustrates panoramic images and a disparity map of two omni-directional images shown in FIG. 3.

FIG. 4 illustrates panoramic images and a disparity map of two omni-directional images illustrated in FIG. 3. Referring to FIG. 4, reference numeral 402 denotes a panoramic image of the first omni-directional image 302, that is, a first panoramic image, reference numeral 404 denotes a panoramic image of the second omni-directional image 304, that is, a second panoramic image, and reference numeral 406 denotes a stereo matching image of the first and second panoramic images 402 and 404, that is, a disparity map. In the disparity map 406, an object near to the stereo omni-directional camera 100 appears relatively bright and an object away from the stereo omni-directional camera 100 appears relatively dark. It is possible to estimate a distance between the stereo omni-directional camera 100 and objects using this brightness information (i.e., depth of an image).

Figure 5:
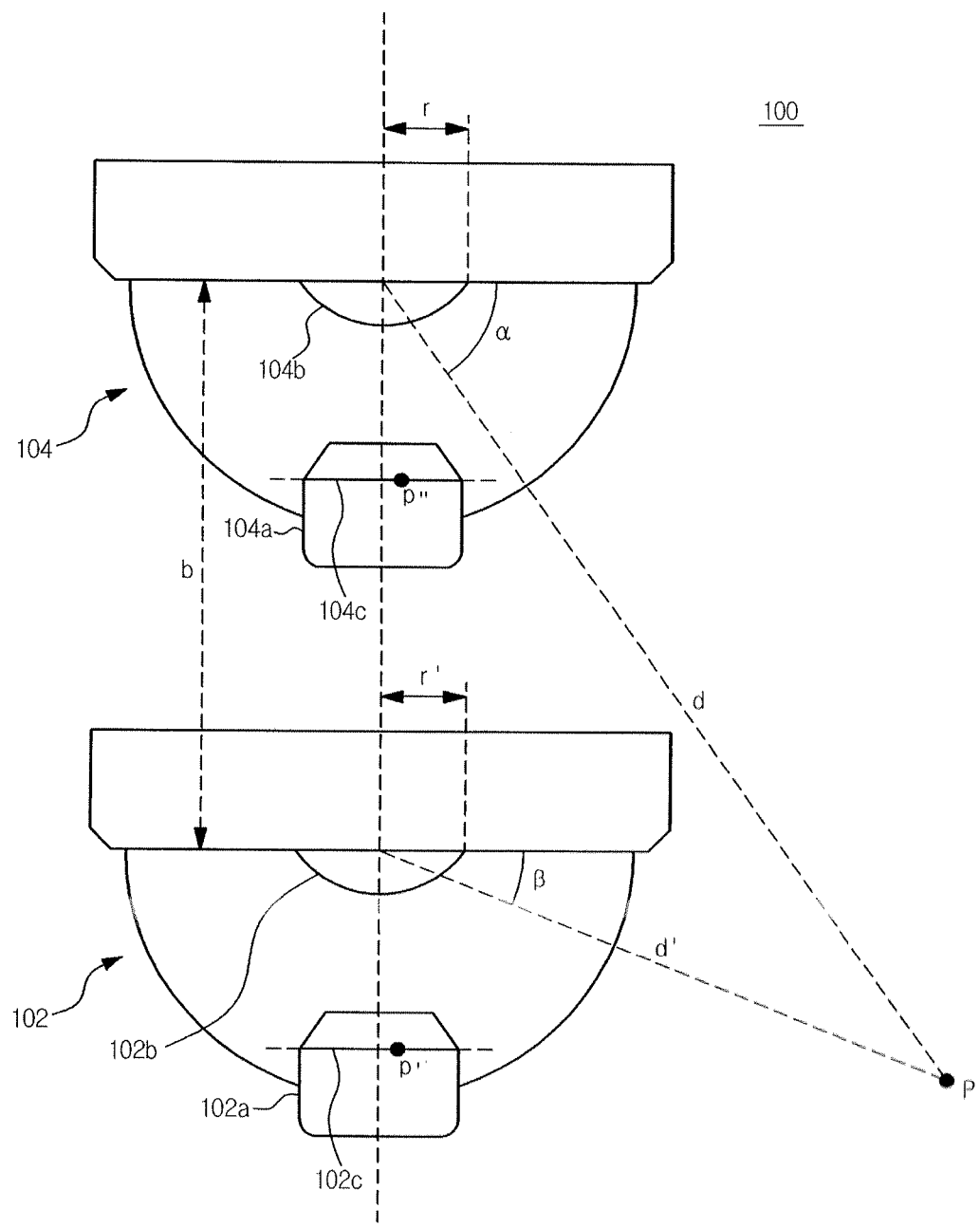
FIG. 5 illustrates a 3-dimensional coordinate extraction concept of a stereo omni-directional camera according to an exemplary embodiment of the present general inventive concept.

FIG. 5 illustrates a 3-dimensional coordinate extraction concept of a stereo omni-directional camera according to an exemplary embodiment of the present general inventive concept. Referring to FIG. 5, b is a base line, that is, a distance between a first omni-directional camera 102 and a second omni-directional camera 104, r and r' are radii of rotating reflectors 102b and 104b, respectively, p' and p'' are feature points on respective omni-directional images, and d' and d are distances between the first and second omni-directional cameras 102 and 104 and an object P. As described in FIG. 1, reference numerals 102c and 104c denote pickup surfaces of the first and second omni-directional cameras 102 and 104, respectively. The feature points p' and p'' can be defined as points disposed on a common line, for example, an epipolar line, to correspond to the object p. References α and β represent first and second angles formed between corresponding major surface lines and a line connecting the object P and a corresponding axis thereof.

The distance d between the second omni-directional camera 104 and the object P is obtained by the following equation (1). The distance d' between the first omni-directional camera 102 and the object P may be similarly obtained.

[Equation 1]

$$d = \frac{\cos(\beta)}{\sin(\alpha - \beta)} b \quad (1)$$

If the distance d between the stereo omni-directional camera 100 and the object P is calculated and an azimuth of the object P based on the stereo omni-directional camera 100 from the panoramic images of FIG. 4 is calculated, a 3-dimensional coordinate P(X, Y, Z) of the object P expressed by the following Equation (2) is obtained.

$$X = d^* \cos(\alpha)^* \cos(\text{azimuth})$$

$$Y = d^* \cos(\alpha)^* \sin(\text{azimuth})$$

$$Z = d^* \sin(\alpha) \qquad \text{[Equation 2]}$$

Figure 6:
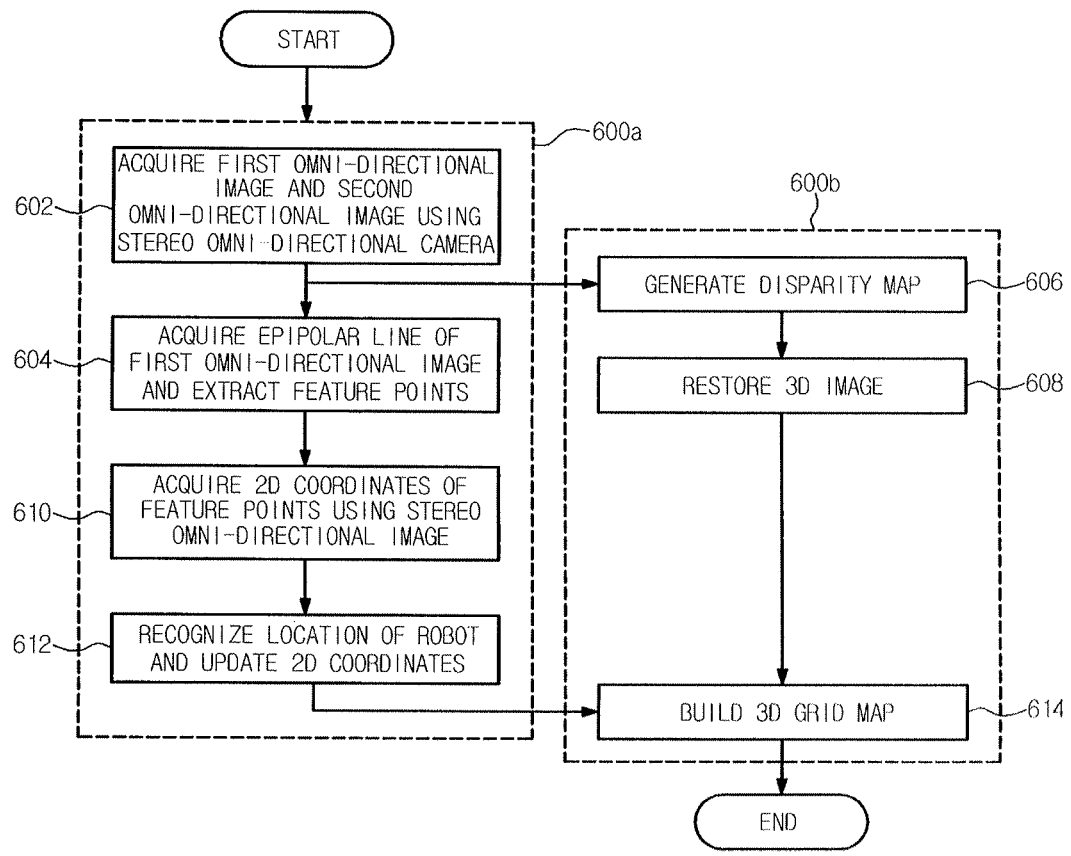
FIG. 6 is a flow chart illustrating a localization and mapping method according to an exemplary embodiment of the present general inventive concept.

FIG. 6 is a flow chart illustrating a localization and mapping method according to an exemplary embodiment of the present general inventive concept. Simultaneously performing localization and mapping is called simultaneous localization and mapping (SLAM). The SLAM according to an exemplary embodiment of the present general inventive concept is implemented using both a 2-dimensional SLAM 600a and a 3-dimensional SLAM 600b. Since the 3-dimensional SLAM requires large numbers of operations, the 2-dimensional SLAM 600a and the 3-dimensional SLAM 600b are combined to reduce the total number of operations and to increase the localization and mapping speed. The number of operations is greatly reduced compared with when obtaining all data through the 3-dimensional SLAM, if performing only the 2-dimensional SLAM in the case where necessary data can be obtained using only the 2-dimensional SLAM, and if performing the 3-dimensional SLAM in the case where the 3-dimensional SLAM is required. A reduction in the number of operations for localization means that it is possible to confirm location more rapidly and further that an automatic traveling apparatus (for example, an unmanned vehicle or a mobile robot) equipped with the stereo omni-directional camera 100 can move at a higher speed.

In the 2-dimensional SLAM 600a, the first omni-directional image 302 and the second omni-directional image 304 are obtained using the first omni-directional camera 102 and the second omni-directional camera 104, respectively, of the stereo omni-directional camera 100 in operation 602. The epipolar line 306 of the first omni-directional image 302 obtained using the first omni-directional camera 102 is acquired and the features 308 on the epipolar line 306 are extracted in operation 604. In the 2-dimensional SLAM 600a, 2-dimensional coordinates of the feature points 308 are acquired. To this end, a result of the 3-dimensional SLAM 600b is used.

In the 3-dimensional SLAM 600b, the disparity map 406 is generated through stereo matching of the first and second panoramic images 402 and 404 in operation 606. A 3-dimensional peripheral image of the stereo omni-directional camera 100 is restored through the disparity map 406 using the method described with reference to FIG. 5 in operation 608.

Referring back to the 2-dimensional SLAM 600a, the 2-dimensional coordinates of the extracted features 308 are obtained by applying the following equations (3), (4), and (5) to a stereo omni-directional image in step 610.

$$\hat{X}_k = f(X_{k-1}, U_k + Q_v) \quad \text{[Equation 3]}$$
$$Z = h(X_k + Q_s)$$

$$x = \begin{bmatrix} x \\ y \\ \phi \\ X_1 \\ Y_1 \\ X_2 \\ Y_2 \\ \cdot \end{bmatrix} \quad \text{[Equation 4]}$$

$$z = \begin{bmatrix} \theta_1 \\ \theta_2 \\ \theta_3 \\ \theta_4 \\ \cdot \\ \cdot \\ \cdot \\ \cdot \end{bmatrix} \quad \text{[Equation 5]}$$

In Equation (3) for the 2-dimensional SLAM, $(X_k)$ is a state vector, $U_k$ is an input vector, $Q_v$ is an input error, Z is a measurement value, and $Q_q$ is a measurement error. The state vector $(X_k)$ of Equation (3) is comprised of the location of the stereo omni-directional camera 100 and 2-dimensional coordinates of the feature points 308 as indicated in Equation (4). Measurement values of Equation (5) are angles (azimuths) of the feature points measured by the stereo omni-directional camera 100. Using Equations (3), (4), and (5), it is possible to estimate the locations of the feature points 308 on the epipolar line 306 and the location of the stereo omni-directional camera 100.

Here, the azimuth of the object p may be defined as an angle between the feature points p' and p" with respect to the object p. For example, the azimuth of the object p may be defined by lines representing the distance d and d' with respect to the object p.

If the stereo omni-directional camera 100 according to the present general inventive concept is mounted in an unmanned vehicle, a mobile robot, etc., the stereo omni-directional camera is moved. Therefore, the previously measured 2-dimensional coordinates are newly updated by estimating the motion of the stereo omni-directional camera 100 in operation 612.

A 3-dimensional grid map of the periphery of the stereo omni-directional camera 100 may be generated by combining the result of the 2-dimensional coordinates obtained in the 2-dimensional SLAM 600a and the result of the 3-dimensional localization obtained in the 3-dimensional SLAM 600b in operation 614. If a count occupied by a voxel is above a prescribed level, the voxel is determined to be occupied and it is possible to build a 3-dimensional grid map. If voxels exist within a field of view of the stereo omni-directional camera 100 (i.e., if occupation or non-occupation can be confirmed) and if the voxels exceed a prescribed occupation count for the prescribed number of times the stereo omni-directional camera captures an image, the voxels are determined to be occupied.

Figure 7:
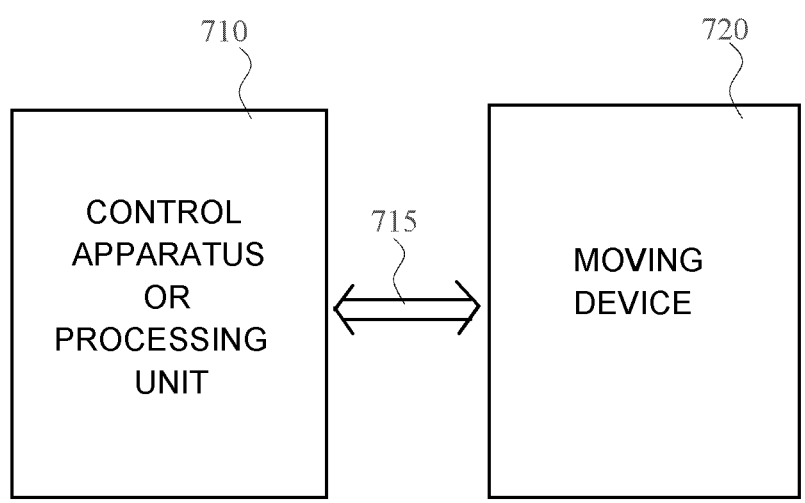
FIG. 7 is a view illustrating a traveling apparatus according to an embodiment of the present general inventive concept.

FIG. 7 is a view illustrating a traveling apparatus 700 according to an embodiment of the present general inventive concept. The traveling apparatus 700 may include a processing unit 710, a moving device 720, and a communication line 715 to connect the processing unit 710 and the moving device 720. The processing unit 710 may be a control system of FIG. 2 to generate a grid map and/or location information and may determine a traveling path along which the moving device performs a movement with respect to the grid map and/or location information. The moving device may have a conventional moving device, and thus, detailed descriptions thereof will be omitted. The communication line 715 may be a wired or wires communication line. When the communication line 715 is a wires communication line, the processing unit 710 and the moving device each may include a wireless unit to communicate with each other. The wireless unit is well known, detailed descriptions thereof will be omitted.

It is possible that the processing unit 710 can be attached to the moving device 720 or that the processing unit 710 may be spaced apart from the moving device 720 and connected to the moving device 720 through the wired or wireless communication line 715.

Accordingly, the processing unit 710 performs the above-described method with respect to FIGS. 1-6 and may perform to determine the traveling path within the information provided from the control method and apparatus of FIGS. 1-6. The moving device 720 may determine the traveling path within the information provided from the control method and apparatus of FIGS. 1-6. In this case, the moving device 720 may include a controller to determine the traveling path using the information provided from the control method and apparatus of FIGS. 1-6 and controls moving structure and/or mechanism to move the traveling apparatus 700 along the traveling path formed around the traveling apparatus 700.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although a few embodiments of the present general inventive concept have been shown and described, it would be appreciated by those skilled in the art that changes may be made in these embodiments without departing from the principles and spirit of the general inventive concept, the scope of which is defined in the claims and their equivalents.

What is claimed is:

1. A method to build a 3-dimensional grid map, comprising:
    acquiring one or more peripheral omni-directional images captured at different locations using first and second cameras of a stereo omni-directional camera;
    confirming a current 2-dimensional location using the acquired one or more peripheral omni-directional images;
    generating a disparity map of the acquired one or more peripheral omni-directional images;
    performing 3-dimensional restoration of the acquired one or more peripheral omni-directional images by using a brightness information of the disparity map; and
    building the 3-dimensional grid map of the periphery of the stereo omni-directional camera by combining a result of the 2-dimensional localization and a result of the 3-dimensional restoration,
    wherein a degree of occupation of a 3-dimensional grid is obtained using a result of the 3-dimensional restoration, and
    wherein if a count occupied by a voxel of the 3-dimensional grid exceeds a prescribed number, a corresponding voxel is determined to be occupied.

2. The method according to claim 1, wherein the confirming of a 2-dimensional location is performed through 2-dimensional localization and mapping using the omni-directional image.

3. The method according to claim 2, wherein the confirming of a 2-dimensional location is performed using feature points on an epipolar line of the omni-directional image.

4. The method according to claim 3, wherein the feature points are obtained by extracting a color edge.

5. The method of claim 1, further comprising determining a distance between at least one object included in the images and the stereo omni-directional camera is based on brightness information.

6. The method of claim 1, wherein the performing 3-dimensional restoration includes extracting a 3-dimensional coordinate of the omni-directional image based on a first azimuth of the omni-directional image with respect to the first camera and a second azimuth of the omni-directional image with respect to the second camera.

7. A method to control an automatic traveling apparatus, comprising:
    acquiring one or more peripheral omni-directional images captured at different locations using first and second cameras of a stereo omni-directional camera;
    confirming a current 2-dimensional location using the acquired one or more peripheral omni-directional images;
    generating a disparity map of the acquired one or more peripheral omni-directional images;
    performing 3-dimensional restoration of the acquired one or more peripheral omni-directional images by using a brightness information of the disparity map;
    building a 3-dimensional grid map of the periphery of the stereo omni-directional camera by combining a result of the 2-dimensional localization and a result of the 3-dimensional restoration;
    determining a traveling path to a target point from a current location based on the 3-dimensional restoration; and
    controlling the automatic traveling apparatus to travel to the target point along the traveling path,
    wherein a degree of occupation of a 3-dimensional grid is obtained using a result of the 3-dimensional restoration, and
    wherein if a count occupied by a voxel of the 3-dimensional grid exceeds a prescribed number, a corresponding voxel is determined to be occupied.

8. The method according to claim 7, wherein the confirming of a 2-dimensional location is performed through 2-dimensional localization and mapping using the omni-directional image.

9. The method according to claim 8, wherein the confirming of a 2-dimensional location is performed using feature points on an epipolar line of the omni-directional image.

10. The method according to claim 8, wherein the feature points are obtained by extracting a color edge.

11. A non-transitory computer readable medium to contain computer-readable codes as a program to perform a method to build a 3-dimensional grid map, the method comprising:
    acquiring one or more peripheral omni-directional images captured at different locations using first and second cameras of a stereo omni-directional camera;
    generating a disparity map of the acquired one or more peripheral omni-directional images;
    performing 3-dimensional restoration of the acquired one or more peripheral omni-directional images by using a brightness information of the disparity map;
    performing 3-dimensional restoration of the acquired one or more peripheral omni-directional images; and
    building the 3-dimensional grid map of the periphery of the stereo omni-directional camera by combining a result of the 2-dimensional localization and a result of the 3-dimensional restoration,
    wherein a degree of occupation of a 3-dimensional grid is obtained using a result of the 3-dimensional restoration, and
    wherein if a count occupied by a voxel of the 3-dimensional grid exceeds a prescribed number, a corresponding voxel is determined to be occupied.

12. An apparatus to build a 3-dimensional grid map, comprising:
    a camera to acquire one or more peripheral omni-directional images captured at different locations using first and second cameras of a stereo omni-directional camera; and
    a controller to confirm a current 2-dimensional location using the acquired one or more peripheral omni-directional images, to generate a disparity map of the acquired one or more peripheral omni-directional images, to perform 3-dimensional restoration of the acquired one or more peripheral omni-directional images by using a brightness information of the disparity map, and to build the 3-dimensional grid map of the periphery of the stereo omni-directional camera by combining a result of the 2-dimensional localization and a result of the 3-dimensional restoration, wherein a degree of occupation of a 3-dimensional grid is obtained using a result of the 3-dimensional restoration, and wherein if a count occupied by a voxel of the 3-dimensional grid exceeds a prescribed number, a corresponding voxel is determined to be occupied.

13. The apparatus of claim 12, wherein the controller determines a distance between at least one object included in the images and the stereo omni-directional camera based on a brightness of the at least one object.

14. A traveling apparatus to move along a path, comprising:
a controller to receive one or more peripheral omni-directional images captured at different locations from first and second cameras of a stereo omni-directional camera, to confirm a current 2-dimensional location using the received one or more peripheral omni-directional images, to generate a disparity map of the acquired one or more peripheral omni-directional images, to perform 3-dimensional restoration of the acquired one or more peripheral omni-directional images by using a brightness information of the disparity map, and to build the 3-dimensional grid map of the periphery of the stereo omni-directional camera by combining a result of the 2-dimensional localization and a result of the 3-dimensional restoration; and
a moving device to move a body of the traveling apparatus according to a traveling path with respect to the 3-dimential grid map, wherein a degree of occupation of a 3-dimensional grid is obtained using a result of the 3-dimensional restoration, and wherein if a count occupied by a voxel of the 3-dimensional grid exceeds a prescribed number, a corresponding voxel is determined to be occupied.

15. A method to build a 3-dimensional grid map, comprising:
generating a current 2-dimensional location using one or more omni-directional images captured at different locations using first and second cameras of a stereo omni-directional camera;
generating a disparity map of the acquired one or more peripheral omni-directional images;
performing a 3-dimensional restoration of the captured received one or more peripheral omni-directional images by using a brightness information of the disparity map; and
building the 3-dimensional grid map by combining a result of the 2-dimensional localization and a result of the 3-dimensional restoration,
wherein a degree of occupation of a 3-dimensional grid is obtained using a result of the 3-dimensional restoration, and
wherein if a count occupied by a voxel of the 3-dimensional grid exceeds a prescribed number, a corresponding voxel is determined to be occupied.

* * * * *